United States Patent [19]

Skelly

[11] 4,330,008
[45] May 18, 1982

[54] MULTIPLE FLOW AND DIRECTIONAL CONTROL VALVE

[76] Inventor: Michael Skelly, Rte. 5-Canyon Oaks-Box 2-4, Claremore, Okla. 74017

[21] Appl. No.: 96,058

[22] Filed: Nov. 20, 1979

Related U.S. Application Data

[63] Continuation-in-part of Ser. No. 929,312, Jul. 31, 1978, Pat. No. 4,219,049.

[51] Int. Cl.³ .................. F15B 13/08; F15B 13/09
[52] U.S. Cl. .................. 137/596.13; 91/32; 91/448; 137/596.12; 137/625.21; 137/625.46
[58] Field of Search ............... 91/32, 448; 137/596.12, 137/596.13, 625.21, 625.45, 625.46, 625.48

[56] References Cited

U.S. PATENT DOCUMENTS 3,405,734 10/1968 Smit et al. ................ 137/625.21 X
3,430,651 3/1969 Jackoboice ................ 137/596
4,203,469 5/1980 Gates ................ 137/625.43

*Primary Examiner*—Gerald A. Michalsky
*Attorney, Agent, or Firm*—James H. Chafin

[57] ABSTRACT

A multiple flow and direction control valve connectable to a plurality of separate fluid sources, the valve having a fluid power port and a fluid exhaust port and a first movable valve body being operable to add or subtract the flow rates of a plurality of fluid sources to either the power port or the exhaust port. The valve has a directional control member having two power ports and one exhaust port and being operable in a first position to apply power fluid to one of the power ports, exhaust fluid being returned through the second power port and routed out of the exhaust port and in a second position said power fluid being routed to the other power port and returned through the first power port to the exhaust port. The valve includes modified directional control members which may be stacked to sequentially provide directional control for a plurality of outputs. Both the multiple flow selection portion and the directional control portion provide for a constant fluid flow rate through the valve to either a power port or an exhaust port.

4 Claims, 31 Drawing Figures

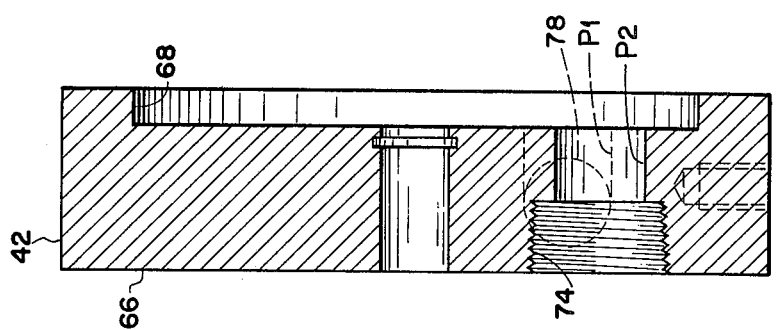
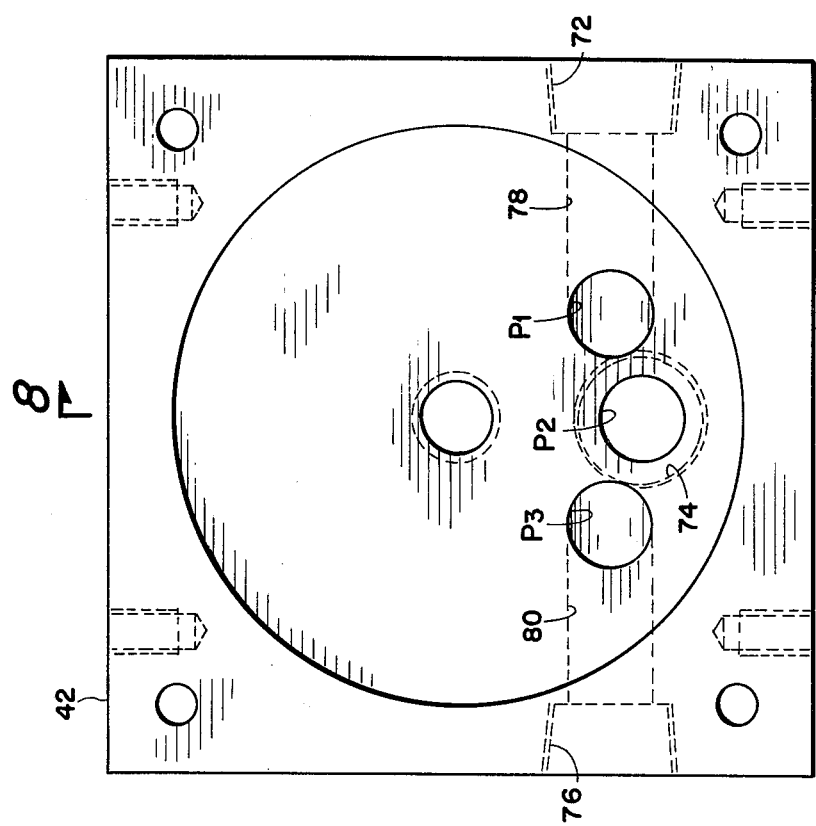
Fig. 8
Fig. 7

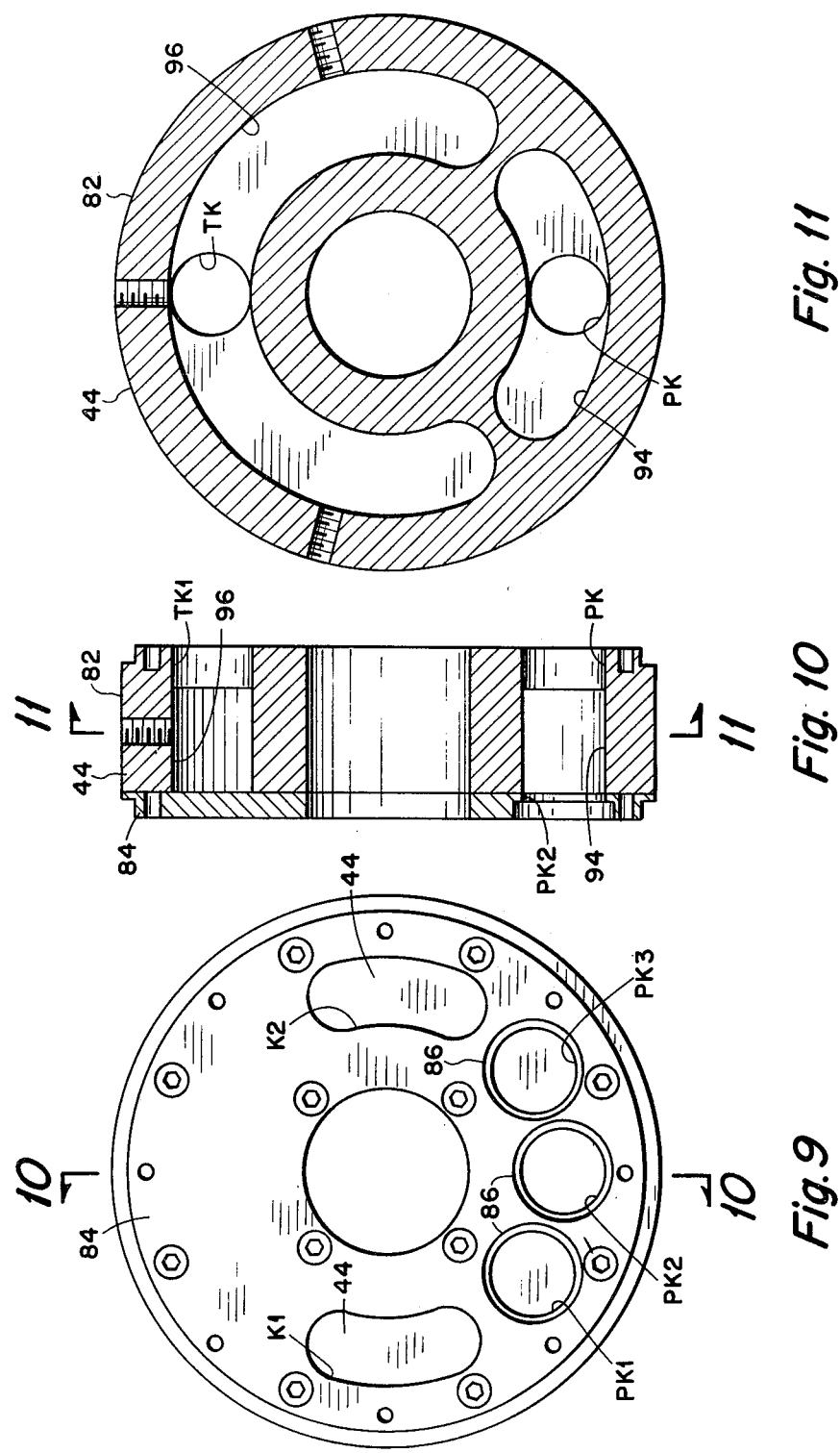

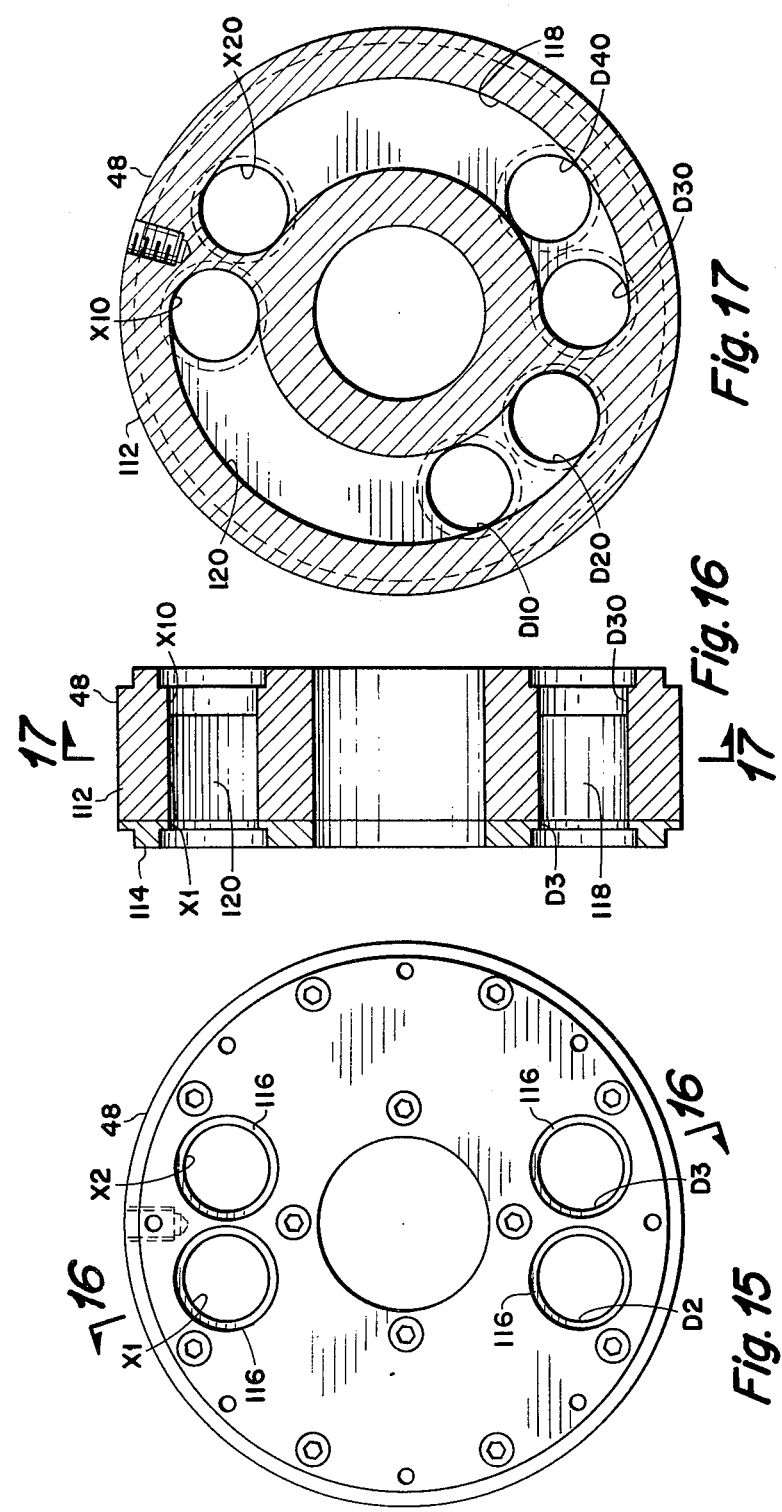

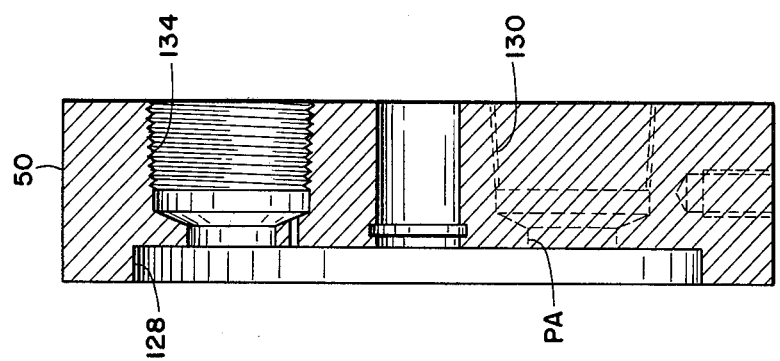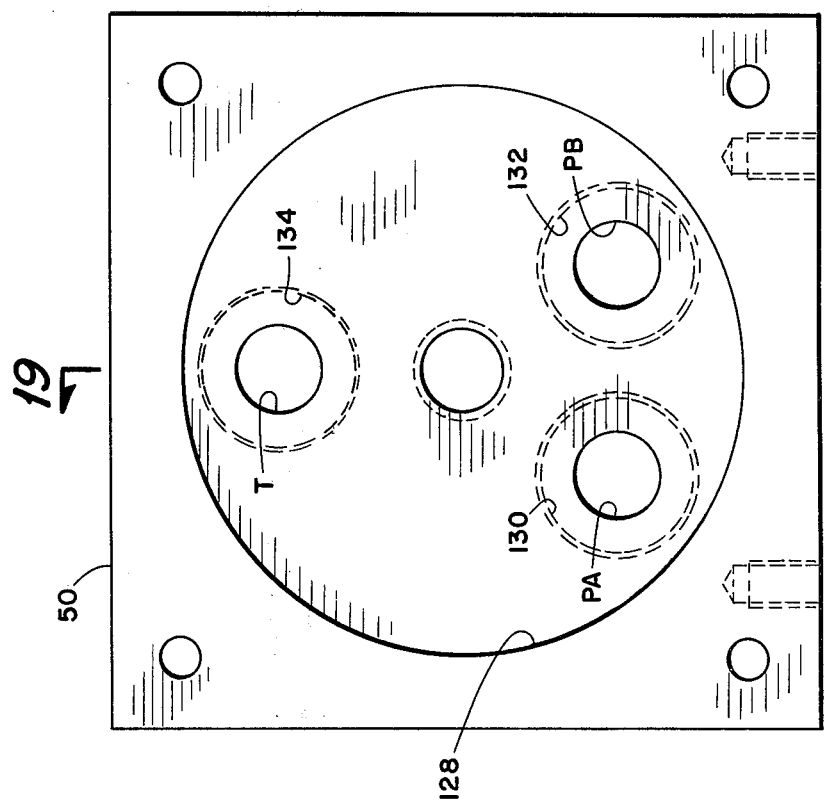

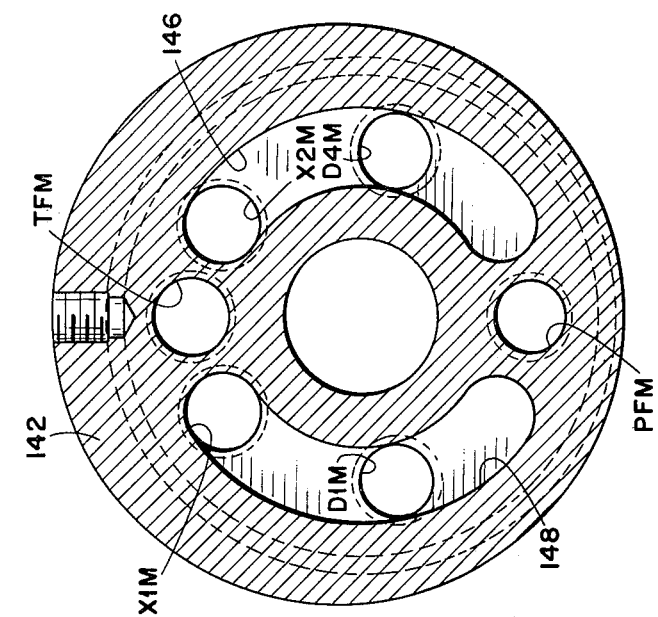
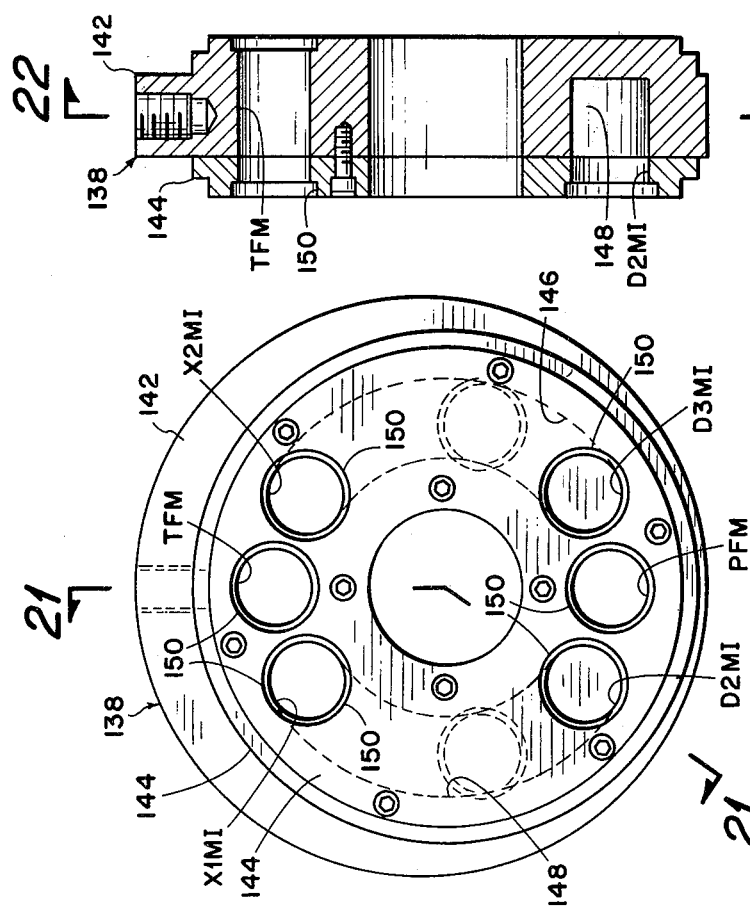
Fig. 22
Fig. 21
Fig. 20

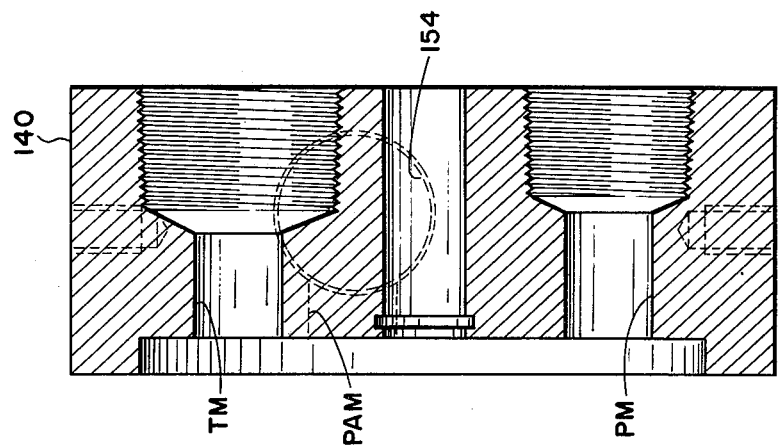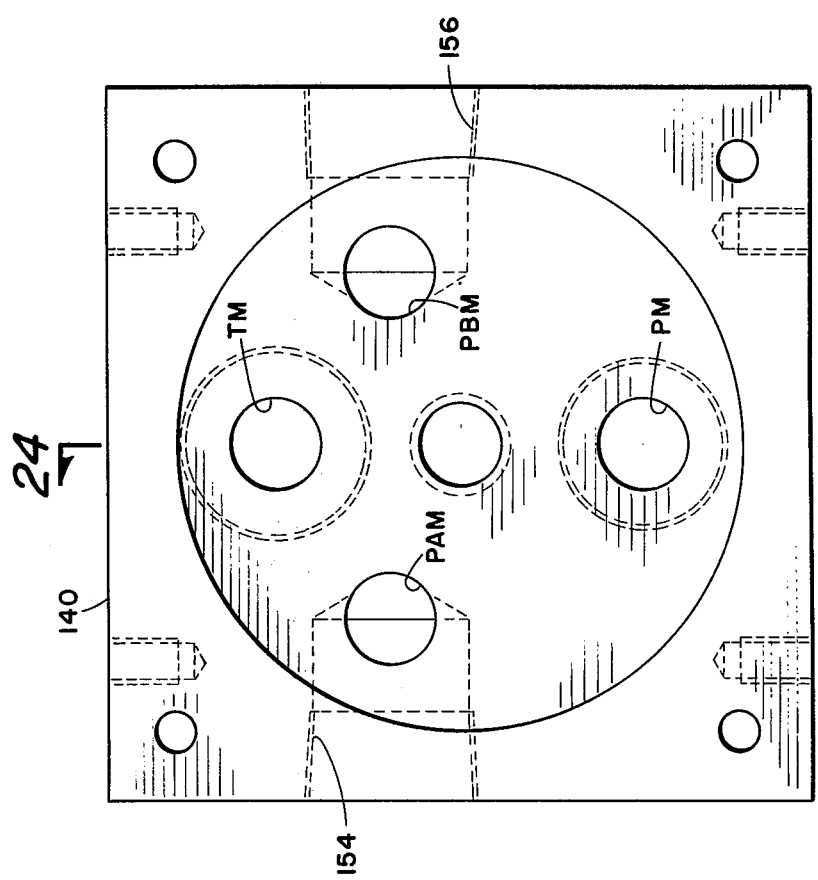

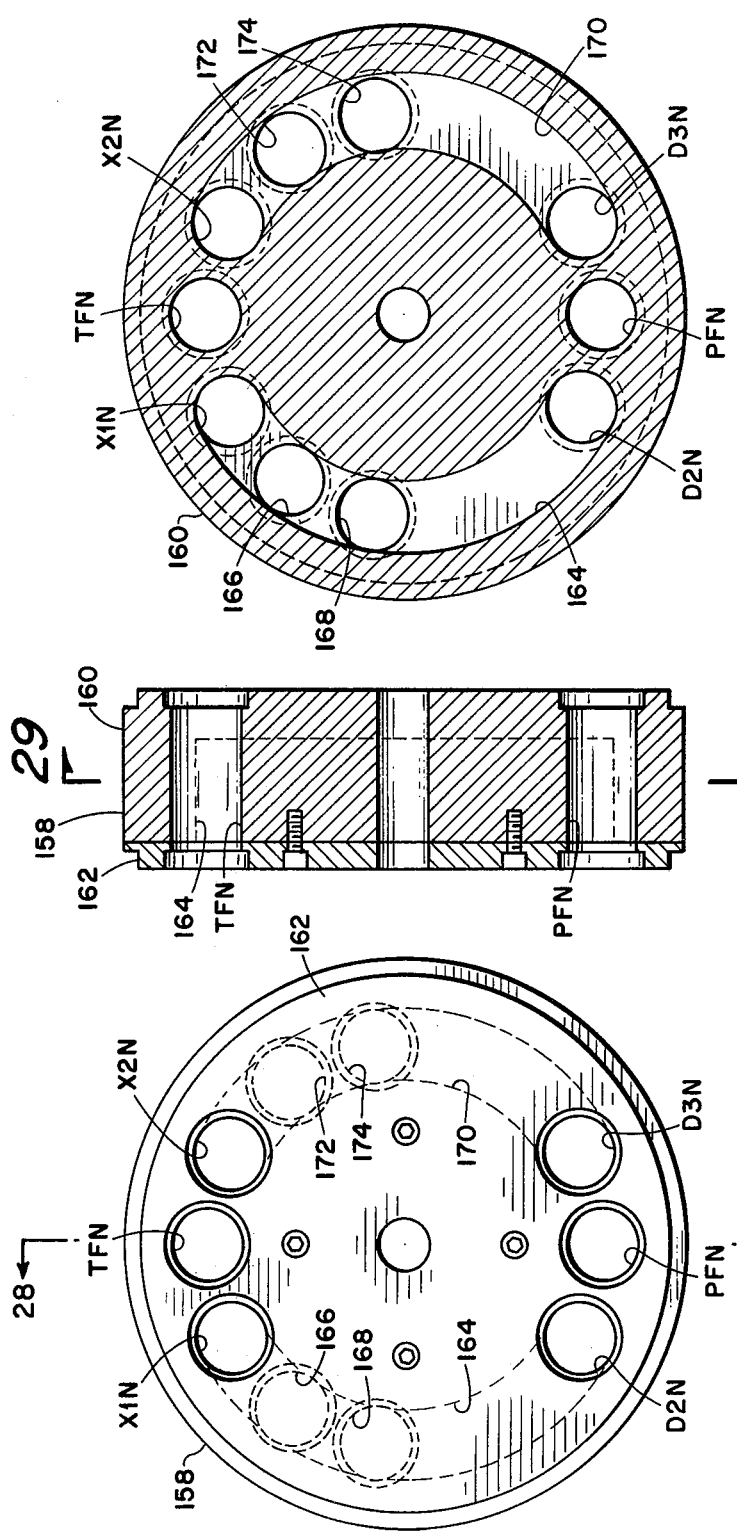

ial valves.

MULTIPLE FLOW AND DIRECTIONAL CONTROL VALVE

CROSS-REFERENCE TO RELATED APPLICATION

This application is a continuation-in-part application of my co-pending application Ser. No. 929,312, filed July 31, 1978, and entitled "Multiple Flow Selection Valve", now U.S. Pat. No. 4,219,049.

BACKGROUND OF THE INVENTION

1. Field of the Invention

The present invention provides a multiple flow and direction control valve and more particularly, but not by way of limitation, to stackable valve body members to provide multiple hydraulic flow selection and directional control to operate various hydraulic apparatus.

2. History of the Prior Art

Fluid power engineers are constantly confronted with the need for being able to drive fluid motors and hydraulic rams, jacks and the like at different rates of speed and to simultaneously be able to control the direction of operation of such equipment.

For instance a typical hydraulic motor is a positive displacement motor or also known as a constant displacement motor, the speed of which can be varied only by increasing the fluid flow rate through the motor. Such hydraulic motors are also operable in either direction by alternately applying fluid flow through the motor in either direction. This is also true of hydraulic rams and jacks which are double acting whereby fluid can be applied under pressure to either side of the hydraulic piston within the ram or jack.

The variable speed of motors, rams, jacks and the like, is typically accomplished by either increasing the fluid pressure causing a higher flow rate through the equipment or by connecting several pumps in parallel through a series of valves to adjust the flow rate through the hydraulic equipment.

The varying of pressure is often impractical since the fluid sources available are also used to operate ancillary equipment such as hydraulic jacks, rams or the like, which often must operate on a lower pressure.

The use of a plurality of parallel hydraulic power sources requires a large number of valves to be connected in parallel and in series in order to put one or more of the hydraulic pumps on the line in connection with the motor or hydraulic equipment to be driven. This solution is costly and increases the likelihood of system failure due to the introduction of many separate valve components.

Further, as stated, it is often desirable to control the direction of flow through the hydraulic equipment which usually requires a separate directional control valve for each unit being operated.

Often the operator of such systems is faced with a large number of valves that must be sequentially operated which gives rise to mistakes being made in operating the right valve at the right time. Such units are further undesirable in that it is extremely complicated to train new operators since each such valve arrangement is usually different for different pieces of equipment.

Another problem associated with the use of several separated valves in series and parallel is that of hydraulic shock encountered by not being able to "feather" or gradually bring in a new volume rate by simultaneously opening and closing several valves.

SUMMARY OF THE INVENTION

The present invention provides a single valve apparatus for providing multiple flow control and which comprises an inlet valve body, an outlet valve body and a rotating valve body member sandwiched between and being rotatable on a common shaft.

The inlet valve body is provided with a plurality of inlet hydraulic ports, each being connectable to a separate hydraulic pump outlet for bringing fluid from several sources and at different pressures and flow rates into the valve. The movable valve body is then provided with a plurality of inlet ports and cavities which may be selectively placed into communication with one or more of the inlet ports. This movable valve body then is provided with an outlet power port and exhaust port whereby the power fluid is passed through the power port. The inlet ports which are not in use are routed directly through the exhaust port to provide a constant flow rate from all of the hydraulic pumps.

The outlet valve body may be connected to the hydraulic devices to be operated or may be connected to the inlet side of a directional control valve body member which is also rotatable at about the same axis as the first rotatable body member. A second outlet body member is provided having first and second outlet ports and an exhaust port.

When the second rotatable valve body member is in the first position, fluid is routed through the first outlet to the hydraulic equipment where exhaust fluid from that hydraulic equipment is returned through the second outlet port and routed to the exhaust port. Conversely, when the second rotatable body member is in a second position, fluid is routed through the second outlet port, returned through the first outlet port and routed to the exhaust port to provide directional control.

A second embodiment of the directional control portion provides three positions for said second rotatable member, the third position being a neutral position to allow fluid to simply pass through the first directional control valve portion and into communication with a second similar directional control valve portion so that a plurality of said directional control valve portions may be stackable for sequential operation of several pieces of equipment through the same valve body.

For example, if a certain piece of equipment is to be operated, its directional control rotating body member is set in the appropriate position to provide drive in the desired direction. All of the previous stacked directional control valve body members are set in a neutral position and the first rotatable valve body member is adjusted to provide the desired fluid flow rate through the valve.

As stated, another advantage of the present system is that a constant flow of hydraulic fluid from all hydraulic pumps or sources is provided regardless of the flow rate to the hydraulic equipment or its direction through the equipment.

The valve may thus be configured to provide multiple flow rates or the valve may be configured to provide directional control only or a combination of the two. The directional control may be configured to be stacked to provide power beyond to other pieces of equipment for sequential operation of that equipment.

DESCRIPTION OF THE DRAWINGS

Other and further advantageous features of the present invention will hereinafter more fully appear in connection with the detailed description of the drawings in which:

FIG. 7 is a back elevational view of the first element of the valve of FIG. 6.

FIG. 8 is an elevational sectional view of the member of FIG. 7 taken along the broken line 8—8.

FIG. 9 is a front elevational view of the second element of the valve of FIG. 6.

FIG. 10 is a side elevational view of the element of FIG. 9 taken along the broken lines 10—10 of FIG. 9.

FIG. 11 is an elevational sectional view of the valve element of FIG. 9 taken along the broken lines 11—11.

FIG. 15 is a front elevational view of the fourth element of the valve of FIG. 6.

FIG. 16 is a side elevational sectional view of the element of FIG. 15 taken along the broken lines 16—16.

FIG. 17 is a front elevational sectional view of the element of FIG. 15 taken along the broken lines 17—17.

FIG. 18 is a front elevational view of the fifth and last element of the valve of FIG. 6.

FIG. 19 is a side elevational view of the element of FIG. 18 taken along the broken lines 19—19.

FIG. 20 is a front elevational view of a movable valve element of a stacked directional control valve of FIGS. 4 and 5.

FIG. 21 is a side elevational view of the element of FIG. 20 taken along the broken lines 21—21.

FIG. 22 is a front elevational sectional view of the element of FIG. 20 taken along the broken lines 22—22.

FIG. 23 is a front elevational view of the directional control outlet element embodying the invention.

FIG. 24 is an elevational sectional view of the element of FIG. 23 taken along the broken lines 24—24.

FIG. 27 is a front elevational view of a second embodiment of a movable valve element of a stacked directional control valve.

FIG. 28 is a side elevational sectional view of the element of FIG. 27 taken along the broken lines 28—28.

FIG. 29 is a sectional elevational view of the element of FIG. 27 taken along the broken lines 29—29.

DESCRIPTION OF THE PREFERRED EMBODIMENTS

Figure 1:
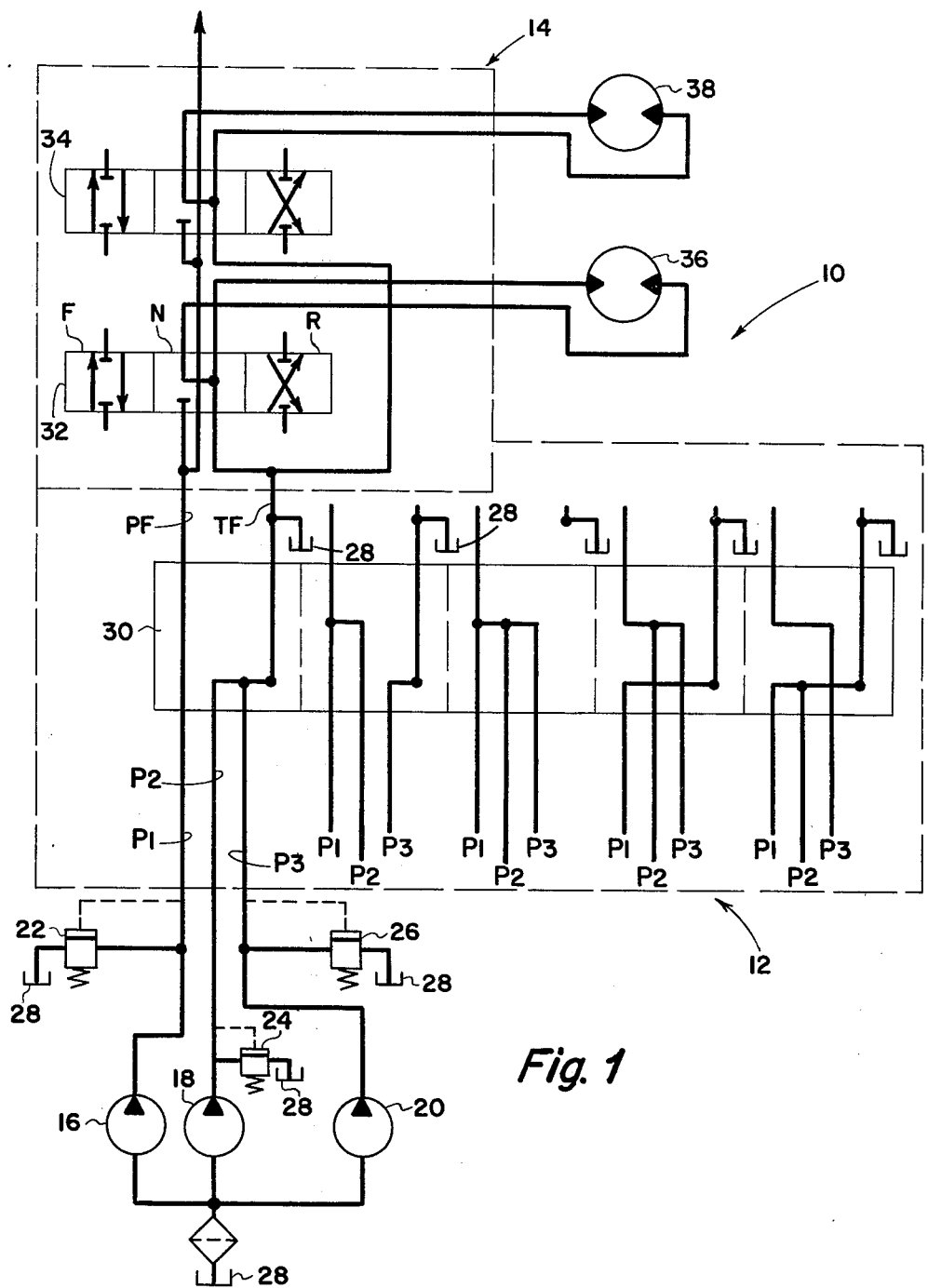
FIG. 1 is a schematic diagram of a hydraulic valve system embodying the present invention.

Referring to the drawings in detail reference 10 generally indicates a multiple flow and directional control valve and generally comprising a multiple flow portion 12 and a directional control portion 14.

In the embodiments shown in the drawings and in FIG. 1, the multiple flow portion 12 of the valve 10 is provided with three inlet ports P1, P2 and P3 which are operably connectable to the output of three separate hydraulic pumps 16, 18 and 20, respectively. The pumps 16, 18 and 20 are provided with suitable pressure relief valves 22, 24 and 26, respectively, and may each be connected to a common hydraulic reservoir or tank 28. It is noted that three inputs is somewhat arbitrary since the invention can be put in practice with a larger number of inputs.

The valve 12 is provided with two outlet ports, PF, which is a work port for providing hydraulic fluid flow to operate hydraulic equipment and the second outlet port TF which is an exhaust port and is operably connected to the hydraulic reservoir 28.

Interposed between the inlet ports and outlet ports of the valve 12 is a rotary five-positioned valve body member 30, which is positionable to provide five different combinations of fluid from the pumps 16, 18 and 20 to the power outlet port PF in a manner that will be hereinafter set forth.

The directional control 14 as schematically depicted in the embodiment of FIG. 1, is provided with a plurality of movable directional control operator members 32 and 34, each being connectable to a suitable hydraulic motor or device indicated by reference characters 36 and 38, respectively. Each of the operator control members 32 and 34 are providable with three positions, a forward position F, a reverse position R, and a neutral position N.

In the schematic of FIG. 1, both directional control operators 32 and 34 are in a neutral position whereby the connections to motors 36 and 38 are directed to tank 28 whereby fluid power from the outlet PF is directed beyond the directional operator control members 32 and 34.

In operation, if directional control member 34 was placed in the F position, the motor 38 would operate in a first direction. If the operator 34 were moved to an R position, the motor 38 would operate in an opposite direction. When the operator 34 is placed in either the F or the R position, power fluid beyond the operators 32 and 34 is stopped.

Likewise, if the operator 32 were placed in the F position, power fluid would be cut off from the operator 34 and the motor 36 would be operated in a first direction. If the operator 32 were moved to the R position, the motor 36 would operate in the opposite direction.

Therefore, it can be seen that any one of a plurality of hydraulic machines may be sequentially operated by placing all of the operator members such as 32 and 34 which are upstream of the device to be operated in a neutral position.

Referring now to FIGS. 3 and 6 through 19, reference character 40 generally indicates a multiple flow and direction control valve which comprises an inlet valve body 42, the output of which is connected to a flow control operator 44 which performs the function of the operator member 30 described in connection with the schematic of FIG. 1. The output of the operator member 44 is applied to the input of a second stationary valve body 46. The output of the valve body 46 is applied to a directional control operator member 48 which performs a similar function to that described in connection with the operator members 32 or 34 in FIG. 1. The output of the valve 40 is provided through a third stationary valve body member 50.

Figure 6:
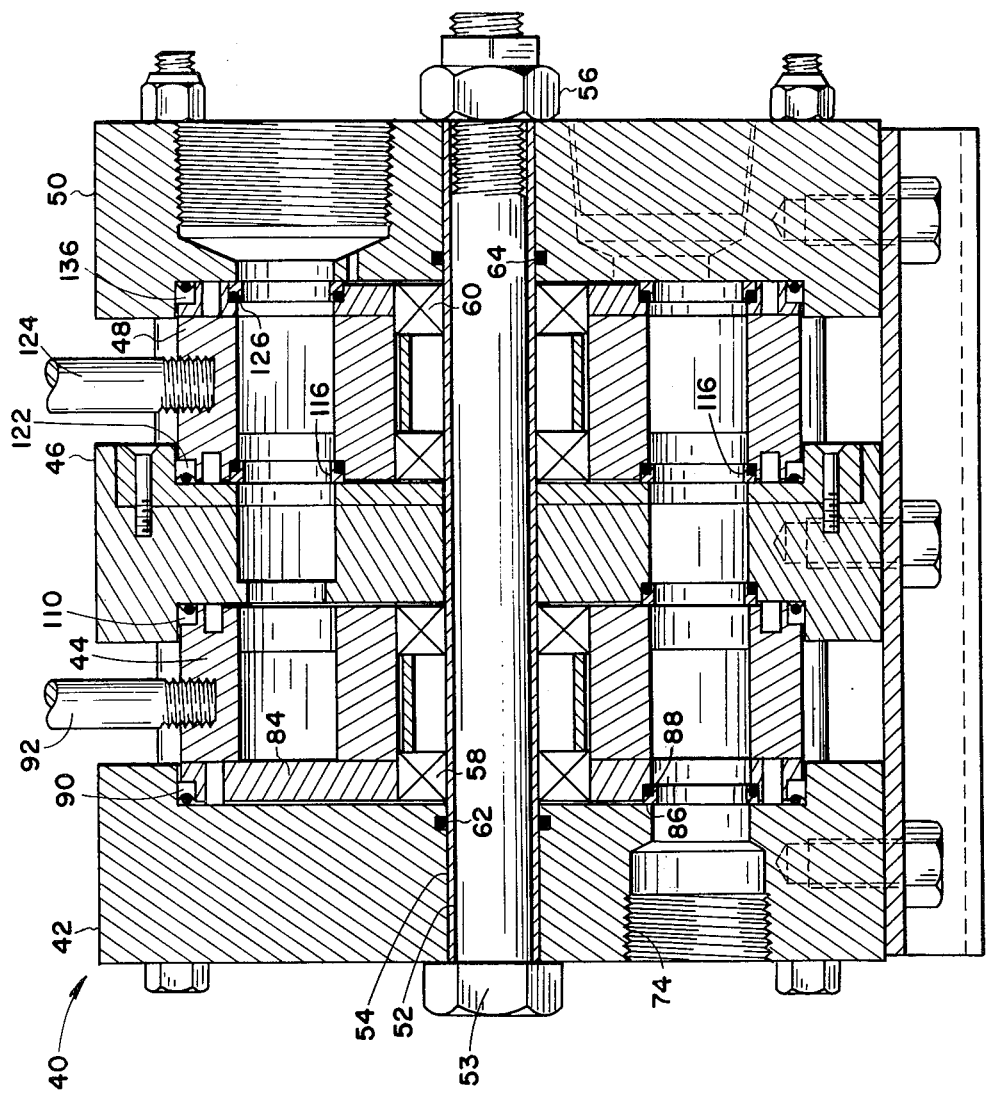
FIG. 6 is a side elevational sectional view of the valve of FIG. 3.
Figure 13:
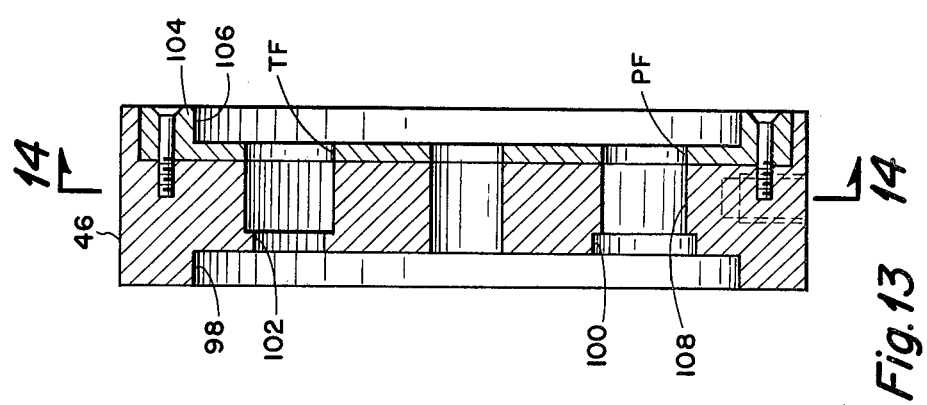
FIG. 13 is a side elevational view of the element of FIG. 12 taken along the broken lines 13—13.
Figure 12:
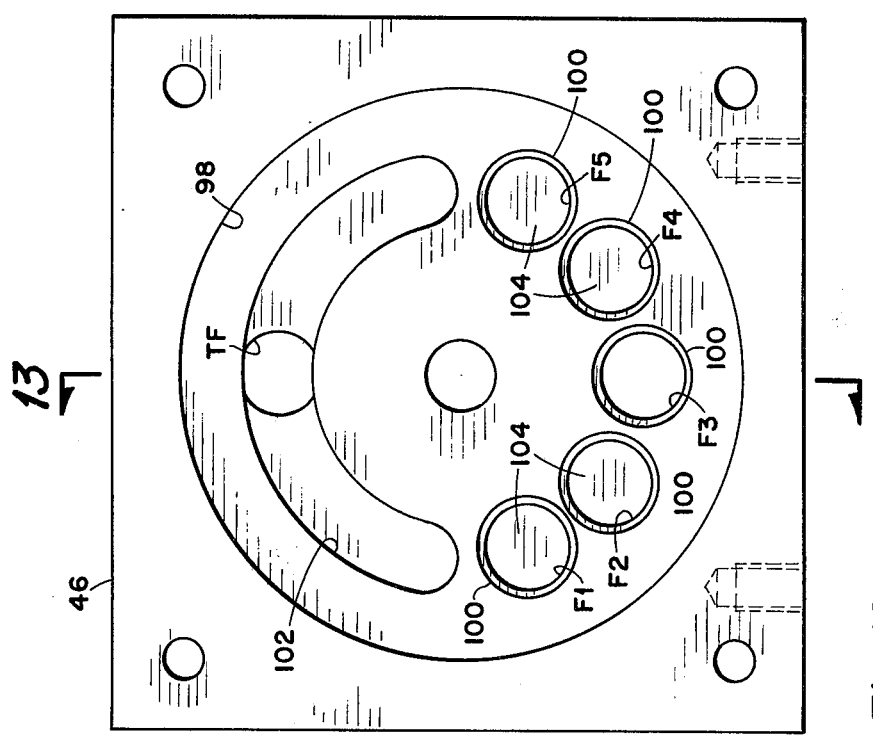
FIG. 12 is a front elevational view of the third element of the valve of FIG. 6.

Referring now to FIG. 6, it can be seen that the stationary and movable valve bodies 42, 44, 46, 48 and 50 are mounted on a common central shaft 52 having a bolt head 53 at one end and which is provided with a sleeve member 54, the valve bodies being held together by a nut member 56 threaded on one end of the shaft 52.

The movable valve body members 44 and 48 are provided with suitable bearing members 58 and 60, respectively, for rotation about the shaft 52 and sleeve member 54. The stationary valve body members 42 and 50 are fluid sealed by way of a pair of O-rings 62 and 64, respectively.

Referring now to FIGS. 6, 7 and 8, the stationary valve body member 42 is provided with an outer front face 66. The rear face thereof is provided with a circular recess 68 for receiving a portion of the movable flow control valve body member 44 therein.

The valve body member 42 is provided with two inlet fluid ports 72 and 76 and a front inlet port 74. The inlet ports 72, 74 and 76 may then be operably connected to three separate hydraulic pumps such as 16, 18 and 20 of FIG. 1. The port 72 is connected through a right angle passageway 78 terminating with a first port P1 which is in communication with the circular recess 68.

The inlet port 76 is likewise connected by way of a right passageway 80 terminating in a second port P3 which again is in communication with the recess 68. The port 74 is connected into communication with the recess 68 by way of a port P2.

The ports P1, P2 and P3 which are in communication with the circular recess 68 are each of equal distance from the center line axis of the shaft 52 as shown in FIG. 7.

Referring now to FIGS. 6, 9, 10 and 11 of the drawings, the flow control movable valve body 44 comprises a cylindrical body portion 82, one face of which is provided with a flat face plate 84.

The face plate 84 is provided with three circular ports PK1, PK2 and PK3 therethrough which are spaced in the same special relationship as the ports P1, P2 and P3 of the valve body member 42. Each of the circular ports PK1, PK2 and PK3 are provided with brass pressure seal rings 86 which are backed with yieldable rubber O-rings 88 for forcing the brass O-ring 86 into contact with the surface of the recess 68 of the valve body member 42.

The plate member 84 is further provided with a pair of oppositely disposed arcuate ports K1 and K2, each having arcuate length substantially equal to the arc subtended by two adjacent ports taken from P1, P2 and P3 of the valve body member 42 for a purpose that will be hereinafter set forth.

An annular sealing ring 90 is provided around the outer periphery of the plate 84 for sealing between the movable body 44 and the fixed valve body member 42. The valve body member 44 is further provided with an outwardly extending operator handle rod 92 for manually effecting rotation of said valve body member 44 with respect to the valve body member 42.

The cylindrical body portion 82 of the valve body member 44 is provided with a first arcuate recess 94 which subtends an arc equal to the arc subtended by the ports PK1, PK2 and PK3, said recess 94 being in communication with said ports. An outlet port PK is provided through the cylindrical body portion 82 and is centrally located within the recess 94 and in communication therewith.

The cylindrical body portion 82 of the valve 44 further comprises a second arcuate recess 96, the arc of which subtends an angle substantially equal to 360° minus that angle subtended by the arcuate recess 94. An outlet port TK is provided through the cylindrical body portion 82 and is oppositely disposed from the outlet PK. The outlet TK is in communication with the arcuate recess 96.

In operation, the face plate member 84 is rigidly secured to the cylindrical body portion 82 so that the ports PK1, PK2 and PK3 are in communication with the recess 94 and hence in communication with the outlet port PK. The ports K1 and K2 are in communication with the recess 96 and hence the outlet port TK.

Referring now to FIGS. 6, 12, 13 and 14, the stationary valve body 46 is provided with a circular recess 98 in one face thereof for receiving the cylindrical portion 82 of the movable valve body 44 therein. The surface of the recess 98 is provided with five radially spaced ports F1, F2, F3, F4 and F5 which are radially spaced over approximately 180°, the outer surface of each port F1, F2, F3, F4 and F5 being provided with brass sealing rings 100 similar to the sealing rings 86 hereinbefore described.

The inside surface of the recess 98 is further provided with an arcuate shaped passageway 102 therein. The opposite surface of the valve body member 46 is provided with a circular plate member 104 rigidly secured thereto, the outer surface of the plate member 104 being provided with a circular recess 106 therein for receiving the directional control movable valve body member 48 therein.

The valve body member 46 comprises an arcuate recess 108 on the opposite side of the body member from the ports F1 through F5 but in communication therewith. The plate member 104 has an outlet power port PF which is centrally disposed with respect to the recess 108 and in communication therewith. The plate member 104 has an exhaust outlet port TF which is oppositely disposed from the port PF and is in communication with the arcuate port 102. It is noted that the port PF is in longitudinal alignment with the port P2 of the valve body member 42.

The valve body member 46 is sealed with respect to the movable valve body member 44 by means of an annular sealing ring 110.

Referring now to FIGS. 6, 15, 16 and 17, the directional control movable body portion 48 is provided with a cylindrical body portion 112 which has a circular plate member 114 secured to one surface thereof, the plate member 114 being receivable within the circular recess 106 of the plate member 104 hereinbefore described.

The plate member 114 is provided with two circular ports D2 and D3 which are radially spaced on one side of the valve body member. The plate member 114 is also provided with a pair of circular ports X1 and X2 which are radially spaced and are disposed on the opposite side of the plate member from the ports D2 and D3. All of the circular ports provided in the plate member 114 are provided with annular seal rings 116 similar to the seal rings 86.

The body portion 112 of the movable valve body 48 is provided with a first arcuate recess 118 which subtends at an angle of slightly less than 180°, said recess 118 being in communication with ports D3, and X2 of the plate member 114. The recess 118 then is provided corresponding outlet ports D30, and X20 and a port D40 adjacent D30 which extend through the cylindrical body portion 112.

A second arcuate recess 120 which subtends almost 180° is provided in the valve body and is in communication with the ports D2 and X1. Corresponding outlet ports D20 and X10 and a port D10 adjacent D20 are provided through the cylindrical valve body portion 112 and likewise are in communication with the recess 120.

The movable valve body 48 is sealed with respect to the fixed valve body member 46 by means of an annular sealing ring 122. An elongated operator handle rod 124 is attached to the valve body 48 for manually effecting rotation thereof about the shaft 52. It is also noted that the outer surface of the outlet ports D10 through D40 and X10 and X2 are provided with seal rings 126 similar to the rings 86 hereinbefore described.

Referring now to FIGS. 6, 18 and 19, the fixed valve body member 50 serves as an outlet member for the valve structure 40 and is provided with a circular recess 128 therein for receiving one surface of the movable body member 48. The valve body 50, within the recess 128 is provided with a pair of power outlet ports PA and PB, said ports being arcuately spaced apart such that the outlet port PA is in substantial alignment with the inlet port P1 of the valve body member 42. The port PB is in substantial longitudinal alignment with the inlet port P3 of the valve body member 42.

The recess also includes an exhaust port T which is oppositely disposed from the ports PA and PB. The outside surface of the valve body member 50 is provided with suitable coupling ports 130 and 132 corresponding to and in communication with ports PA and PB. Another outlet coupling port 134 is provided in communication with the exhaust port T. The ports 130 and 132 are operably connected to either side of a hydraulic apparatus such as a hydraulic motor or a hydraulic jack while the port 134 is operably connected to a hydraulic reservoir or tank 28. The movable valve body member 48 is sealed with respect to the outlet body member 50 by means of an annular sealing ring 136.

An example of the operation of the valve would be to decide to derive a hydraulic motor or other hydraulic apparatus in a predetermined direction and at a predetermined velocity. As an example the velocity might be determined to be provided by the output of a hydraulic pump connected to the inlet port P1. The flow control movable valve body 44 then is positioned to align its inlet port PK3 with the port P1 of valve body 42. Fluid would then travel through the port PK3 of valve body 44, through the recess 94 thereof and out of the valve body 44, through the port PK. The port PK is now in alignment with the port F1 of the valve body 46 which in turn routes the hydraulic fluid through the recess 108 thereof and out of the port PF.

Simultaneously the inlet ports P2 and P3 route the hydraulic fluid through the port K2 of the movable valve body 44 which in turn routes the hydraulic fluid through the recess 96 thereof and out of the port TK. The port TK then allows the fluid to pass through the aperture 102 of the valve body 46 and out of the valve body 46 at port TF. Therefore, it can be seen that in the position hereinbefore described, a constant volume of fluid flows through the flow control portion of the valve at a constant rate but whereas the setting of the valve has provided power from hydraulic pump No. 1 only to the outlet port PF while the fluid from inlets P2 and P3 are routed out of port TF. In practice if flow control was all that was desired in a valve, the outlet port PF could be connected directly to an apparatus to be operated by the hydraulic source and TF could be directed to return the fluid to the hydraulic reservoir or tank.

Hydraulic fluid flow for all five positions of the movable valve body member 44 are set out in Table 1 below. It is seen for any of the settings of the movable valve body portion 44, fluid power is always provided at the outlet port PF while fluid exhaust is always provided at the outlet port TF.

TABLE 1

| Position | 42 | FLOW CONTROL 44 | 46 |
|---|---|---|---|
| 1 | (P1) | - (PK3 − PK) | - (F1 − PF) |
|   | (P2 + P3) | - (K2 − TK) | - (TF) |
| 2 | (P1 + P2) | - (PK2, PK3 − PK) | - (F2 − PF) |
|   | (P3) | - (K2 − TK) | - (TF) |
| 3 | (P1 + P2 + P3) | - (PK1, PK2, PK3 − PK) | - (F3 − PF) |
| 4 | (P2 + P3) | - (PK1, PK2 − PK) | - (F4 − PF) |
|   | (P1) | - (K1 − TK) | - (TF) |
| 5 | (P3) | - (PK1 − PK) | - (F5 − PF) |
|   | (P1 + P2) | - (K1 − TK) | - (TF) |

The directional control portion of the valve is described by setting the movable directional control member 48 in a first position whereby power fluid coming out of the valve body 46 at port PF is directed into port D3 of the valve body member 48. This fluid then flows through the passageway 118 and out of the port D40. The port D40 is in alignment with the outlet port PB of the valve body member 50. Fluid flows out of PB then to drive a hydraulic apparatus. The exhaust fluid from that hydraulic apparatus re-enters the valve body member 50 through the port PA wherein it re-enters the valve body member 48 through the port D20 where the fluid then travels through the recess 120 and out of the port X10. The fluid exiting at X10 then travels through the valve body 50 and out of the exhaust port T.

Simultaneously exhaust fluid coming out of the port TF of the valve body member 46, enters the valve body 48 through the port X1 and exits the valve body 48 through the port X10 and to the exhaust port T of the valve body 50.

It can be seen by rotating the valve body member 48 to its second position whereby PF is lined up with the port D2, drive fluid is provided out of the port PA. Exhaust fluid is received back into port PB and routed to tank as set forth in Table 2 herein.

TABLE 2

| | DIRECTION CONTROL | | |
|---|---|---|---|
| Position | 46 | 48 | 50 |
| 1 | (PF) | - (D3 — D40) | - (PB) - Drive |
| | T | - (X10 — D20) | - (PA) - Exhaust |
| | (TF) | - (X1 — X10) | - (T) |
| 2 | (PF) | - (D2 — D10) | - (PA) - Drive |
| | T | - (X2 — D30) | - (PB) - Exhaust |
| | (TF) | - (X2) | - (T) |

Therefore, it can be seen that the valve 40 may be operably connected to three separate hydraulic power sources which would yield five separate flow rates in forward and reverse direction for each of those flow rates. The number of flow rates for n fluid inlets would be 2n-1.

Figure 2:
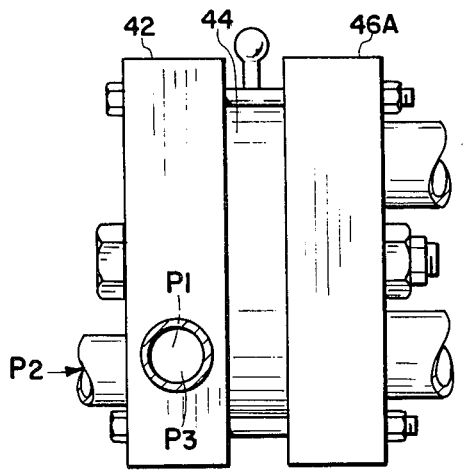
FIG. 2 is a side elevational view of a valve for effecting multiple flow rates embodying the present invention.
Figure 3:
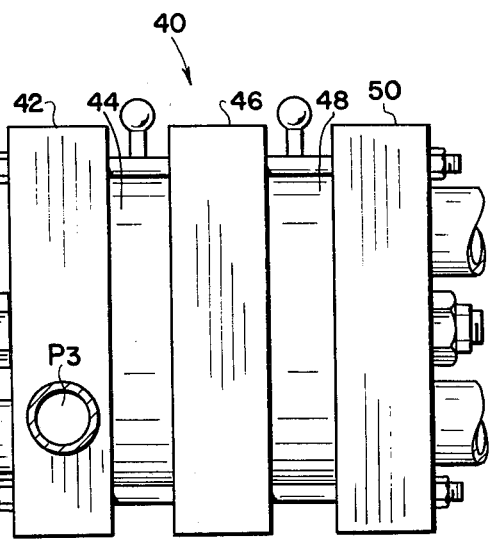
FIG. 3 is a side elevational view of a valve for effecting multiple flow rates and directional control embodying the present invention.

It can further be seen that as hereinbefore set forth, the multiple flow rate portion may be used separately from the directional control portion by simply modifying the valve body member 46 to permit the hydraulic apparatus to be connected directly thereto. This configuration is depicted in FIG. 2 of the drawings wherein the outlet valve body is designated as 46A, the valve body members 42 and 44 being unchanged.

It is further noted that the directional control portion of the valve may also be operated separately, again by modifying valve body member 46 such that the port PF is connected directly to a hydraulic power source, the port TF being omitted, a variation of this configuration being hereafter described in connection with the valve of FIGS. 25 and 26.

Figure 4:
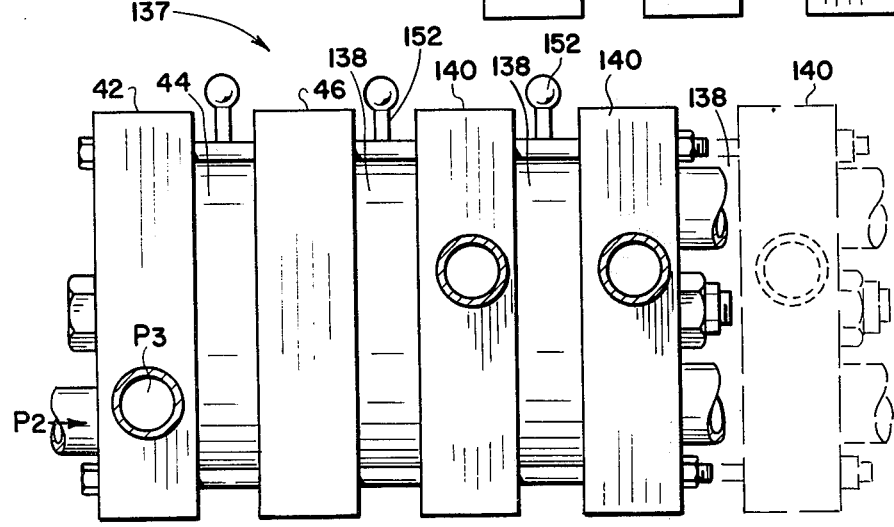
FIG. 4 is a side elevational view of a valve for effecting multiple flow rates and a plurality of stacked directional control elements.
Figure 14:
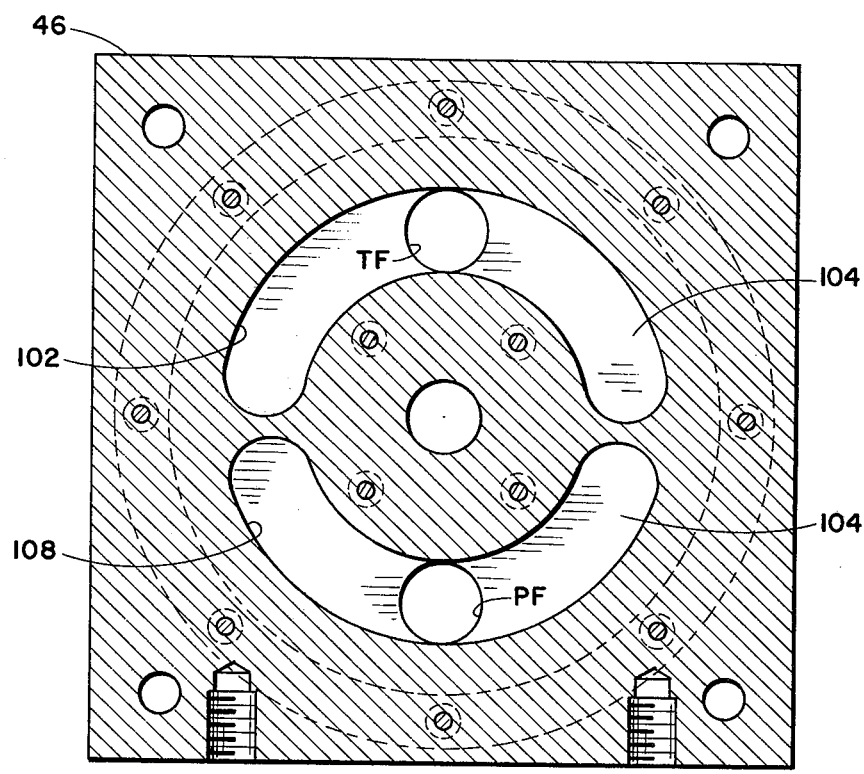
FIG. 14 is a front elevational sectional view of the element of FIG. 12 taken along the broken lines 14—14.

Referring now to FIG. 4 of the drawings, reference character 137 generally indicates a second embodiment of the multiple flow and directional control valve 40.

The valve 137 comprises an inlet valve body member 42, movable directional control body member 44 and directional outlet body member 46 identical to those valve body members described in conjunction with the valve 40.

The valve 137 is provided with stackable directional control members for the sequential operation of a plurality of hydraulic rams and other hydraulic equipment not including rotary hydraulic motors and the like. The movable directional control member 138 is a three-position directional control member set out in more detail in FIGS. 20, 21 and 22 of the drawings.

The stationary valve body member 140 serves as an outlet valve body member and is described in greater detail in FIGS. 23 and 24 of the drawings.

The movable directional control valve body member 138 comprises a cylindrical body portion 142 having a circular face plate member 144 secured thereto, said face plate member 144 being receivable into the recess 106 of the valve body member 46. The plate member 144 is provided with a first port PFM that extends completely through the plate member 140 and the cylindrical valve body portion 142. A second exhaust port member TFM is oppositely disposed from the port PFM and likewise extends completely through the plate member 144 and the valve body portion 142.

The plate member 144 is provided with a pair of inlet ports D2MI and D3MI which are disposed adjacent to and on either side of the port PFM.

The valve body member 142 is provided with an arcuate recess 146 which is in communication with the inlet ports D3MI and X2MI. The recess 146 is provided with three outlet ports that extend through the valve body portion 142, said ports being D3M which is in alignment with the end port D3MI, D4M which is positioned adjacent D3M and X2M which is in alignment with the inlet port X2MI.

The valve body portion 142 is provided with a second oppositely disposed arcuate recess 148 which provides fluid communication between the inlet ports D2MI and X1MI. Three outlet ports are provided in the recess 148 and which extend through the valve body 142, said ports being identified by reference character D2M which is in alignment with the inlet port D2MI, D1M positioned adjacent the port D2M and X1M which is in alignment with the inlet port X1MI.

It is further noted that both ends of the ports PFM and TFM are provided with O-ring sealing members 150 similar to the sealing member 86 hereinbefore described. Inlet ports X1MI, D2MI, D3MI and X2MI are likewise provided with sealing rings 150.

It is further noted that the outlet face of the valve body portion 142 is provided with sealing rings around each of the outlet ports. An operator rod member 152 is secured to the valve body member 138 to effect rotation thereof.

Referring now to FIGS. 23 and 24, reference character 140 describes a stationary outlet valve body member which may be utilized in conjunction with the movable valve body member 138 for directional control. The valve member 140 is provided with a flow-through power outlet port PM which is in longitudinal alignment with the power inlet port PF. A second oppositely disposed exhaust outlet TM is provided through the valve body 140 and is in longitudinal alignment with the exhaust inlet TF.

The valve body is provided with a pair of working outlet ports PAM and PBM which are oppositely disposed and radially spaced from the ports PM and TM. The port PAM is provided with a right angle passageway 154 which extends out one side of the valve body 140 while the working port PBM is provided with a right angle passageway 156 which extends out the opposite side of the valve body 140. The ports 154 and 156 are operably connected to either side of a hydraulic jack or other hydraulic apparatus for a purpose that will be hereinafter set forth.

In operation power fluid from valve body member 46, port PF, is routed into communication with the directional control valve body member 138. In a first position PF is directed through the port D2MI and through the arcuate recess 148 and out of the port X1M. The fluid from X1M is then routed through the port PAM of the valve body member 140 and on to the hydraulic device, such as a double acting hydraulic ram.

Exhaust fluid from the other side of the ram is then routed back into the port PBM of the valve body member 140 where it re-enters the valve body 138 via the port D4M. Fluid then passes through the arcuate recess 146 where it is routed out of the port X2M to tank TM.

Simultaneously, exhaust fluid from the port TF of the valve body member 146 is passed through the valve body member 138 via port X2M and to tank via the port TM of the valve body member 140.

When the valve body member 138 is set in a second position, drive may be effected in the opposite direction as depicted in Table 3 herein. When the valve body member 138 is set in a third neutral position, power fluid is simply passed through that valve body member to the next succeeding directional control member again as set out in Table 3. It is noted that when the valve body member 138 is in a neutral position, the ports PAM and PBM of valve body member 140 are shut off or locked in their hydraulic position. If this valve body member 140 were connected to double acting rams, this would hold those rams in the position until again acted on by way of the valve body member 138.

This use would be unacceptable for typical hydraulic motors since hydraulic motors would require some free-wheeling after power is removed.

TABLE 3

| | DIRECTION CONTROL | | |
|---|---|---|---|
| Position | 46 | 138 | 140 |
| 1 | (PF) | - (D2MI − X1M) | - (PAM) - Drive |
| | TM | - (X2M − D4M) | - (PBM) - Exhaust |
| | (TF) | - (X2M) | - (TM) |
| 2 | (PF) | - (D3MI − X2M) | - (PBM) - Drive |
| | TM | - (X1M − D1M) | - (PAM) - Exhaust |
| | (TF) | - (X1M) | - (TM) |
| 3 | (PF) | (PFM) | - (PM) - 138 |
| | (TF) | (TFM) | - (TM) - 138 |

In the case of the use of hydraulic motors, a variation of the operator member 138 is utilized and is depicted in FIGS. 5, 27, 28 and 29 by reference character 158.

Figure 5:
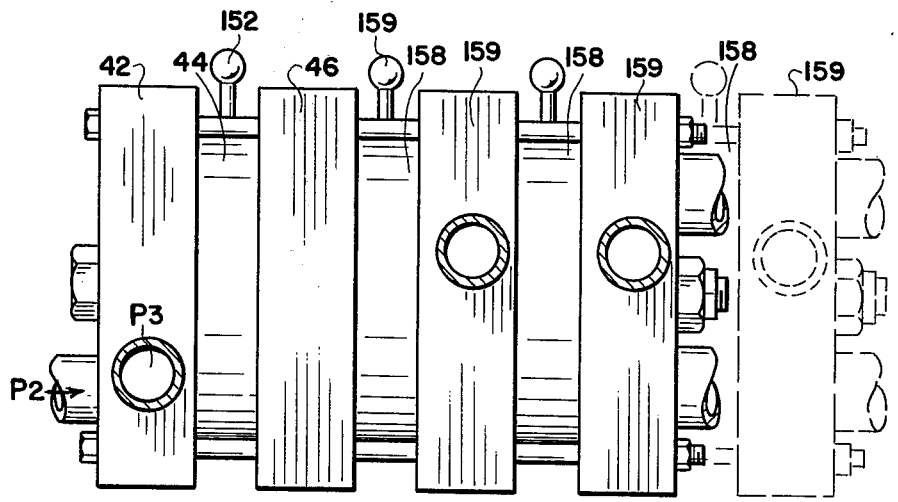
FIG. 5 is a side elevational view of a valve having stacked directional controls embodying the present invention.

Referring now to FIG. 5 of the drawings, reference character 157 generally depicts a valve having speed control by way of body members 42, 44 and 46, the directional control being provided by a movable valve body member 158 which is fed into an outlet valve body member 159. The valve body member 159 may be connected then to either side of a hydraulic motor or the like. Subsequent valve body members 158 and 159 may be stacked in order to provide sequential directional control in a manner that will be hereinafter set forth.

The rotatable valve body member 158 is provided with a cylindrical body member 160 having a face plate member 162 secured to one face thereof.

The plate 162 is provided with port PFN which extends through the plate 162 and through the cylindrical body member 160. The plate 162 further comprises an exhaust port TFN again which extends through both the plate 162 and cylindrical body member 160.

The plate 162 further comprises a pair of oppositely disposed exhaust ports X1N and X2N on either side of exhast port TFN. The plate 162 further comprises a pair of power ports D2N and D3N which are oppositely disposed and placed on either side of the power port PN. The ports X1N, X2N, D2N and D3N all pass completely through both the plate member 162 and the cylindrical body member 160.

The body member 160 is provided with a first arcuate recess 164 which places the ports X1N and D2N into communication with each other under the plate member 162.

The body member 160 is provided with a pair of adjacent ports 166 and 168 which are located adjacent port X1N and are in communication with the arcuate cavity 164.

A similar arcuate cavity 170 is provided in the body member 160 and places the ports X2N and D3N into communication. The body member 160 is further provided with a pair of adjacent ports 172 and 174 which are also in communication with the arcuate recess 170.

Figure 31:
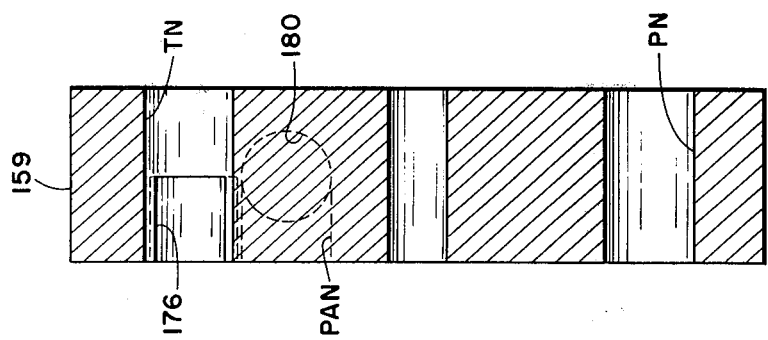
FIG. 31 is a sectional view of the valve body of FIG. 30 taken along the broken lines 31—31.
Figure 30:
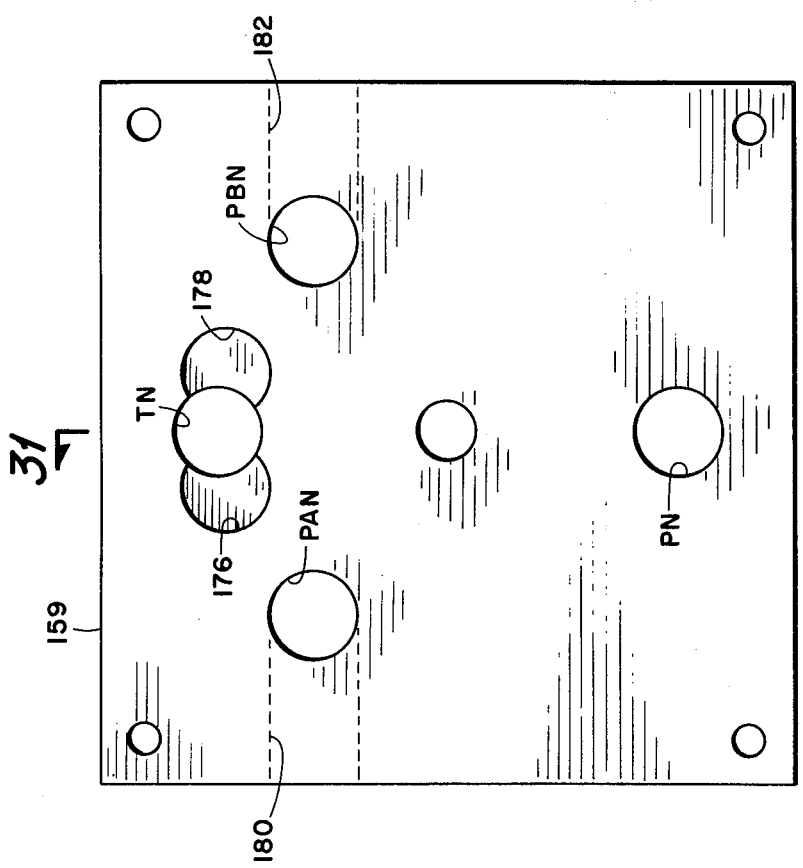
FIG. 30 depicts a valve body outlet member for a second embodiment of a directional control valve.

Referring now to FIGS. 30 and 31 of the drawings, the valve outlet body member 159 comprises a power port PN that extends completely through the valve body and an oppositely disposed exhaust port TN which also extends through the valve body. A pair of circular recesses 176 and 178 are provided on either side of the port TN and are in overlapping engagement with the port TN. The recesses 176 and 178 extend part way into the valve body 159 for a purpose that will be hereinafter set forth. The valve body 159 also includes a pair of oppositely disposed working ports PAN and PBN which are radially spaced from the ports PN and TN. The port PAN is provided with a right angled passageway 180 which extends to the side of the valve body member 159 while the port PBN is provided with a similar right angle passageway 182 which extends to the opposite side of the valve body 159.

The passageways 180 and 182 are connectable to opposite sides of a hydraulic motor in the manner depicted in the schematic of FIG. 1.

In operation the valve body member 158 may be set in a first position to receive power fluid from the port PF of the valve body member 146. The power fluid is passed from port PF to port D2N, through the arcuate recess 164 to the port X1N. The fluid is passed then from the port X1N to the valve body member 159 through the working port PAN to drive the hydraulic motor. Exhaust fluid from the hydraulic motor re-enters the valve body member 159 at port PBN where it is transmitted via the port 174 of the valve body member 158 to the port X2N and then exhausted to tank through the port TN of the valve body member 159.

Simultaneously, the exhaust fluid from the port TF of valve body member 46 is passed directly through port X2N of the valve body member 158 and then exhausted to tank via the port TN of the valve body 159.

In a second position, fluid is passed through the hydraulic motor in the opposite direction as set out in Table 4 herein.

It is noted also from Table 4 that in the third or neutral position, fluid from the port PF of valve body 46 is passed directly through the valve body 158 via the port PFN, and through the valve body 159 through the port PN to the next succeeding directional control valve elements. Simultaneously, the exhaust fluid from the port TF of valve body member 46 is passed through the directional control valve body member 158 via the port TFN and exhausted via the port TN on to the next succeeding directional control unit. In this position it can be seen that both working ports PAN and PBN of the valve body member 159 are allowed to enter the valve body member 158 via ports 166 and 172, respectively. This fluid is then passed through the ports X1N and X2N, respectively, to tank via the circular recesses 176 and 178, respectively.

TABLE 4

| | DIRECTION CONTROL | | | |
|---|---|---|---|---|
| Position | 46 | 158 | 159 | |
| 1 | (PF) | - (D2N − X1N) | - (PAN) | - Drive |
| | TN | - (X2N − 174) | - (PBN) | - Exhaust |
| | (TF) | - (X2N) | - (TN) | |
| 2 | (PF) | - (D3N − X2N) | - (PBN) | - Drive |
| | TN | - (X1N − 168) | - (PAN) | - Exhaust |
| | (TF) | - (X1N) | - (TN) | |
| 3 | (PF) | - (PFN) | - (PN) | |
| | (TF) | - (TFN) | - (TN) | |
| | PAN | - (166 − X1N) | - (176 − TN) | |
| | PBN | - (172 − X2N) | - (178 − TN) | |

Therefore, it can be seen that with the valve body arrangement of 158 and 159, directional controls may be stacked for sequentially operating hydraulic motors of the like where it is required that when power is not being applied to the hydraulic motor that it be freewheeling.

Figure 26:
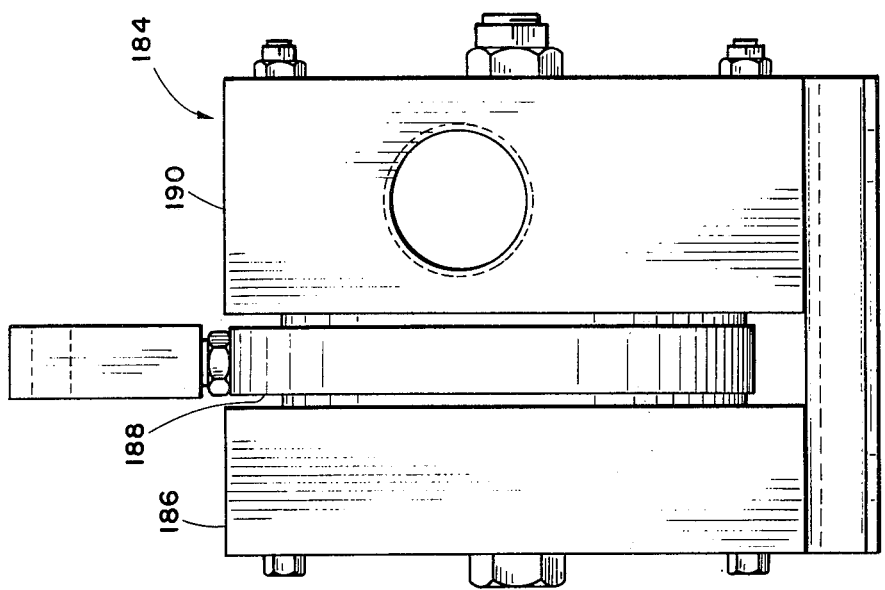
FIG. 26 is a side elevational sectional view of the valve of FIG. 25 taken along the broken lines 26—26.
Figure 25:
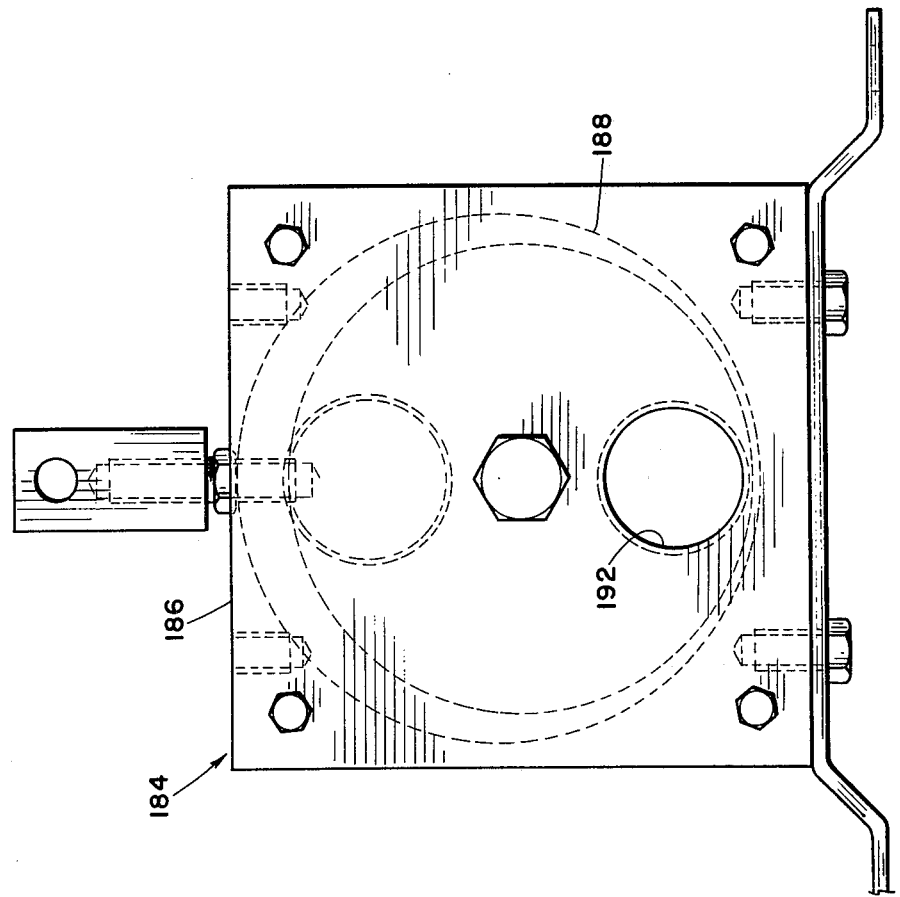
FIG. 25 is a front elevational view of a directional control valve embodying the invention.

Referring now to FIGS. 25 and 26 of the drawings, reference character 184 generally indicates a valve which is configured for directional control only. The valve 184 comprises an inlet valve body member 186 which is operably connected to a movable directional control valve body member 188 which in turn is connected to an outlet valve body member 190.

The valve body member 186, since the valve body 184 is dealing with directional control only, is provided with a single port 192 which is operably connectable with a hydraulic power source.

The movable valve body member 188 may then take on the configuration of either the directional control valve body member 48, the directional control valve body member 138 or the directional control valve body member 158 according to particular usage desired. Since in the case of directional control only, the flow-through of exhaust from other hydraulic power sources is not present, the movable valve body member 188 may be simplified since it does not require the direct flow-through of hydraulic fluid.

The valve body member 190 may than take on the configuration of the valve body member 50 in the case where it is not desired to stack the directional control members. The valve body member 190 may take on the configuration of valve body member 140 in the case of stackable directional control members for hydraulic rams and the like, or the valve body member 159, in the case of stackable controls for the operation of hydraulic motors or the like.

From the foregoing it is apparent that the present invention provides a very versatile multiple flow and directional control valve system which may be utilized to provide several flow rates through a single valve and wherein directional control may be provided for sequential operation of several hydraulic devices.

Whereas the present invention has been described in particular relation to the drawings attached hereto, other and further modifications apart from those shown or suggested herein may be made within the spirit and scope of the invention.

What is claimed is:

1. A multiple flow directional control valve comprising three spaced-apart first, second and third valve body members, a plurality of fluid inlet ports provided in the first valve body member, a pair of passageways provided in the second valve body member, one being a power passageway bore and the other being an exhaust passageway bore, three outlet ports provided in the third valve body member comprising first and second working outlet ports and an exhaust outlet port, a fourth valve body member sealingly and movably interposed between said first and second valve body members, means carried by the said fourth valve body member to operably connect a plurality of combinations of said inlet ports into open communication with the power passageway bore of the second valve body member while simultaneously operably connecting the remaining inlet ports into open communication with the exhaust passageway bore, a fifth valve body member sealingly and movably interposed between the second and third valve body members, means carried by the fifth valve body member such that in a first position thereof to operably connect the power passageway bore into communication with the first working outlet port while simultaneously connecting the second working outlet port into communication with the exhaust outlet port, and in a second position to operably connect the power passageway bore into communication with the second working outlet port while simultaneously connecting the first working outlet port into communication with the exhaust port.

2. A multiple flow directional control valve as set forth in claim 1 wherein the fourth and fifth valve body members are rotatably carried by the first, second and third valve body members about a common longitudinal rotational axis and wherein said ports and passageways thereof are radially spaced about said longitudinal axis.

3. A multi-flow directional control valve as set forth in claim 2 wherein the first and second working outlet ports exit the third valve body member transversely and wherein the exhaust outlet port is longitudinally disposed and including a longitudinally disposed power outlet port through the third valve body member between the first and second working outlet ports and being oppositely disposed from the exhaust outlet port and including a power fluid passageway through the fifth valve body member and including an exhaust power passageway through the fifth valve body member such that upon placing the fifth valve body member in a third intermediate position, the fluid from the power passageway bore of the second valve body member passes through the power passageway of the fifth valve body member to the power outlet port, while the exhaust passageway is in communication with the exhaust passageway bore of the second valve body member and the exhaust outlet port.

4. A multi-flow directional control valve as set forth in claim 3 wherein a plurality of additional valve body members substantially identical to the fifth and third valve body members are connected in series with the first, second and third valve body members to provide a plurality of sequential directional controls.

* * * * *